US008790114B2

(12) United States Patent
Goebel et al.

(10) Patent No.: US 8,790,114 B2
(45) Date of Patent: Jul. 29, 2014

(54) BYPRODUCT COMPOUND RETENTION DEVICE FOR FUEL RICH START-UP COMBUSTOR

(75) Inventors: Steven G Goebel, Victor, NY (US); Gerald E Voecks, Fairport, NY (US); Robert N Carter, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 3145 days.

(21) Appl. No.: 10/256,666

(22) Filed: Sep. 27, 2002

(65) Prior Publication Data

US 2004/0062956 A1 Apr. 1, 2004

(51) Int. Cl.
- F23D 11/44 (2006.01)
- H01M 8/06 (2006.01)
- H01M 8/04 (2006.01)
- B01D 47/00 (2006.01)
- B01D 53/56 (2006.01)

(52) U.S. Cl.
USPC ............ 431/11; 429/423; 429/441; 423/212; 423/213.2; 423/213.5; 423/213.7

(58) Field of Classification Search
USPC ......... 431/11, 6, 12, 8, 7, 207, 326, 328, 170, 431/268, 354; 429/20, 40, 13; 422/198; 48/127.9, 198.7; 60/723; 423/210, 212, 423/213.2, 213.5, 213.7; 359/853
See application file for complete search history.

(56) References Cited

U.S. PATENT DOCUMENTS

| | | | |
|---|---|---|---|
| 4,473,622 A | 9/1984 | Chludzinski et al. | 429/19 |
| 5,623,819 A * | 4/1997 | Bowker et al. | 60/776 |
| 5,676,912 A * | 10/1997 | Sharma et al. | 423/213.2 |
| 5,989,507 A * | 11/1999 | Sung et al. | 423/213.5 |
| 6,162,267 A * | 12/2000 | Priegnitz et al. | 48/199 FM |
| 6,168,689 B1 * | 1/2001 | Park et al. | 204/164 |
| 6,232,005 B1 * | 5/2001 | Pettit | 429/19 |
| 6,245,214 B1 * | 6/2001 | Rehg et al. | 205/764 |
| 6,299,995 B1 * | 10/2001 | Abdo et al. | 429/17 |
| 6,413,484 B1 * | 7/2002 | Koch | 423/245.3 |
| 6,740,303 B2 | 5/2004 | Boneberg et al. | 423/652 |
| 6,838,063 B2 | 1/2005 | Kondo et al. | 422/209 |
| 6,851,947 B2 * | 2/2005 | Sugimoto et al. | 431/7 |
| 6,955,860 B2 * | 10/2005 | Matoba | 429/20 |
| 7,086,853 B2 * | 8/2006 | Kamijo | 431/8 |
| 2002/0000067 A1 | 1/2002 | Numata et al. | 48/61 |
| 2002/0029522 A1 | 3/2002 | Abe | 48/61 |
| 2002/0031690 A1 * | 3/2002 | Shimazu et al. | 429/19 |
| 2002/0155331 A1 | 10/2002 | Kamegaya et al. | 429/19 |

FOREIGN PATENT DOCUMENTS

| | | | | |
|---|---|---|---|---|
| DE | 3345958 | 6/1984 | | H01M 8/06 |
| DE | 19955929 | 6/2001 | | C01B 3/36 |
| DE | 10130945 | 3/2002 | | C01B 3/38 |

(Continued)

*Primary Examiner* — Avinash Savani
*Assistant Examiner* — Vivek Shirsat
(74) *Attorney, Agent, or Firm* — Quinn Law Group, PLLC

(57) ABSTRACT

The present invention relates to a fuel processing unit in an electrochemical fuel cell power plant, and more specifically to a preheater combustor that forms byproduct compounds that may destroy downstream catalytic reactors for fuel reforming. The present invention includes a retention material that collects the byproduct compounds prior to entry into the downstream reactors. The retention material may be comprised of at least one active compound and a support structure, preferably having a porous body to facilitate tortuous fluid flow. Further aspects of the invention may include an electrical charging device for use with the retention device material that enhances collection of byproduct compounds. The present invention also includes a method of operation for start-up incorporating a retention material.

27 Claims, 6 Drawing Sheets

(56) References Cited

FOREIGN PATENT DOCUMENTS

| DE | 10148620 | 4/2002 | C01B 3/00 |
| DE | 10104607 | 8/2002 | C01B 3/00 |
| EP | 1186570 | 3/2002 | C01B 3/58 |
| JP | 59-199502 A | * 11/1984 | |
| JP | 2001-227416 A | * 8/2001 | |

* cited by examiner

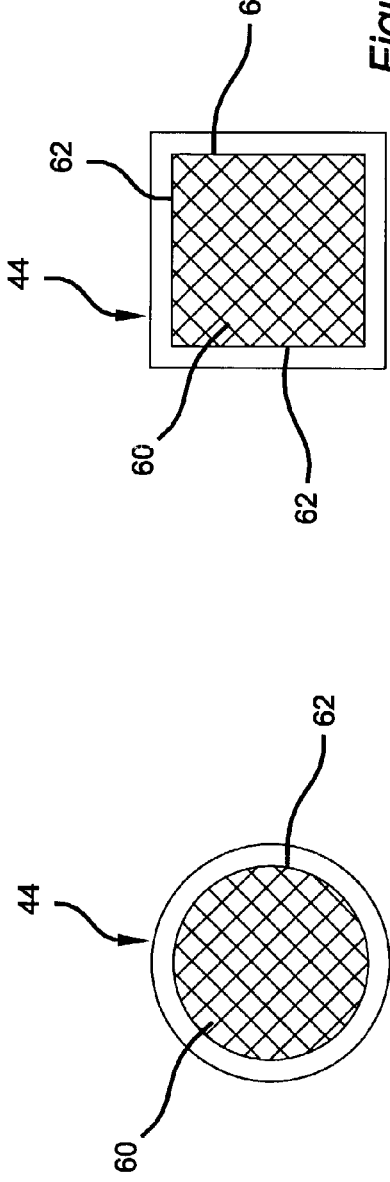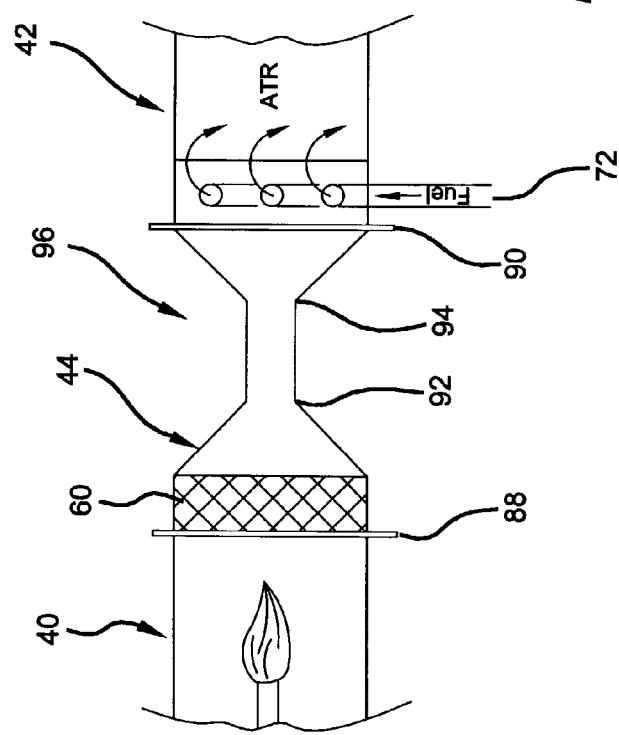

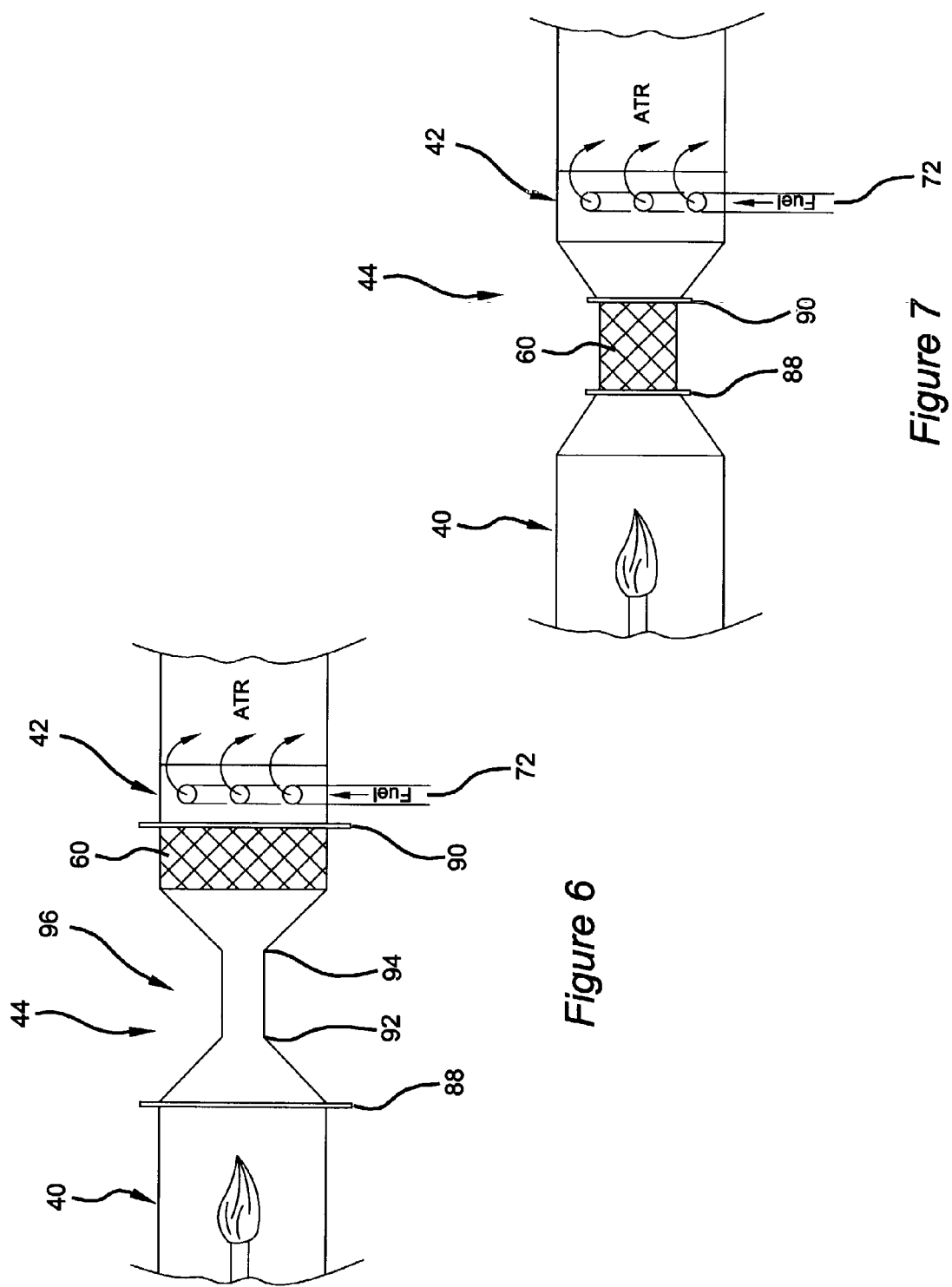

BYPRODUCT COMPOUND RETENTION DEVICE FOR FUEL RICH START-UP COMBUSTOR

FIELD OF THE INVENTION

The present invention relates to a retention device in an electrochemical cell power plant, and more specifically to a byproduct compound retention device located within a fuel processor possessing a fuel rich start-up combustor for use with an electrochemical fuel cells.

BACKGROUND OF THE INVENTION

Electrochemical fuel cells can be used in a vast array of applications as a power source, including as an alternate power source to the internal combustion engine for vehicular applications. An electrochemical fuel cell contains an anode and a cathode, with an interstitial space maintained between the two electrodes, where the fuel that is oxidized at the anode passes through as ions to be reacted with oxygen which is reduced at the cathode. One preferred embodiment of the electrochemical fuel cells is a proton exchange membrane (PEM), where hydrogen ($H_2$) is used as a fuel source or reducing agent at the anode. In a PEM fuel cell, oxygen ($O_2$) is typically provided as the oxidizing agent at the cathode, either in pure gaseous form or combined with nitrogen and other inert diluents present in air. During operation of the fuel cell, electricity is garnered by electrically conductive elements proximate to the electrodes via the electrical potential generated during the reduction-oxidation reaction occurring within the fuel cell.

One of the difficulties in implementing the fuel cell as a power source for vehicular applications has been supply issues for delivery of hydrogen to the vehicle, as an infrastructure for hydrogen distribution is not currently available in most areas. One approach to overcoming these difficulties has been the advent of a vehicular fuel processor which is a permanent onboard fixture. The fuel processor is capable of converting a hydrocarbon fuel into a hydrogen feed stream for the fuel cell. Preferred hydrocarbon fuels available in current distribution systems include low molecular weight alcohols (e.g. methanol or ethanol) or other hydrocarbon fuels (e.g. gasoline).

One preferred method of processing a hydrocarbon fuel has been through a multiple reactor fuel processing unit. A typical preferred sequence of reactions in the fuel processor following the introduction of the hydrocarbon fuel can include: a primary reactor and one or more CO cleanup reactors, where the hydrogen-containing gas created through the fuel processor reactions is introduced to the fuel cell anode. One preferred embodiment of the fuel processor is where the primary reactor is an autothermal reformer (ATR) which combines the partial oxidation reaction (POx) and the steam reforming (SR) reaction within one reactor, the primary CO clean-up reactor is a water gas shift reactor (WGS) and the secondary CO clean-up reactor is a preferential oxidation reactor (PrOx). All of the above mentioned reactions are preferably facilitated by catalysts, which enable lower temperature operating ranges to achieve reaction energy activation levels and higher reaction conversions.

Start-up conditions within the fuel processor pose challenges in the implementation of fuel cell technology. As used herein, "start-up" conditions generally refers to transient operating conditions when the fuel processor is transitioning or being engaged from a cold state to normal, or steady-state, ranges for operating temperature, fuel delivery and hydrogen output. "Normal", "steady-state", "non-start-up" or "run mode" conditions refer to the operating conditions when temperatures are within typical operating ranges and hydrogen-containing effluent is reformed in the fuel processing unit without detrimental byproduct formation such as unconverted fuel. These terms may further include transient operating conditions that may be the result of varying load requirements on the system, but not relating to start-up conditions. One of the primary issues is that to reach steady-state operations, temperatures in the primary reactor must be stabilized within the range of about 400° C. to about 700° C. Within these temperature ranges, the catalyst within the primary reactor is capable of properly converting hydrocarbon fuel to hydrogen rich effluent.

When temperatures in the primary reactor are below this range, reaction conditions can lead to extremely detrimental results in the catalysts both within the fuel processor and the fuel cell stack. Condensation can occur on the catalysts within the fuel processor on cold start-up, or carbonaceous deposits may form on the catalytic surfaces. Incomplete reactions and low reaction conversion efficiency in the fuel processor can result in high concentrations of carbon monoxide or carbon (soot) deposition that poison the downstream reactors and the fuel cell stack, as well as lowering power output from the fuel cell. Transitions during cold start-up pose numerous problems, and to reach the proper stable temperature ranges without detrimental side effects, either the fuel processor must be allowed to run for a relatively long duration of time off-line (i.e., bypass the fuel cell stack) to reach steady-state operations, or other methods of preheating the fuel processor reactors must be used.

A fuel cell system typically has at least one combustor, which includes an indirect combustor that receives stack anode exhaust, and further may be capable of transferring heat via a heat exchanger to the fuel processor reactors. Additionally, a fuel cell may have a direct fire combustor within the fuel processor reactors. These combustors are generally employed in heating a system during start-up to achieve steady-state operations from a cold start, as well as potentially providing heat to reactors that carry out endothermic reactions and supplementing energy on high power demand situations.

One preferred combustor is a direct fire inline preheater that is placed upstream of the primary reactor. With this combustor, the fuel in the preheater combustor flame is oxidized to release heat, which is used to raise the temperature of the downstream reactor. The preheater combustor flame can be operated as a fuel lean or fuel rich flame. A fuel lean flame refers to circumstances when the fuel is provided sub-stoichiometrically to the oxygen for a combustion reaction. Conversely, a fuel rich flame refers to the fuel being fed in excess of the stoichiometric level of oxygen. Both fuel lean or rich flames have advantages during start up. However, the fuel rich flame in the preheater combustor is preferred in this start-up scenario, where the equivalence ratio (actual fuel to oxygen delivered divided by stoichiometric fuel to oxygen) is greater than one, and more preferably is greater than 2. Fuel rich operation is preferred to avoid oxidizing conditions on the reactors (especially CuZn water gas shift catalysts) and to permit heating of downstream reactors by staged air addition.

The preferred equivalence ratio varies based on combustor design factors, such as whether the fuel is mixed within the preheater combustion zone. The flame temperature in comparison to the equivalence ratio likewise varies based upon system design parameters. As the fuel to oxygen ratio approaches the combustion stoichiometry the flame temperature increases. The flame temperature reaches a peak, or maximum value at an equivalence ratio of 1. As additional fuel in stoichiometric excess is introduced into the combustion zone, the equivalence ratio increases, and the flame temperature follows a reducing trend. Thus, operating within a fuel rich combustor start-up scenario (with an equivalence ratio greater than 1) provides a flame temperature that is relatively low, avoids oxidizing conditions, and provides fuel for downstream reactions by air staging. The start-up combustor flame temperature operating range is limited at the upper end (i.e., maximum temperature) by the physical properties of the catalyst downstream, which has the potential to degrade above about 700° C. to 1000° C., and at the lower end (i.e., minimum temperature) by the formation of undesirable byproducts including carbon containing compounds which are created when the combustion reaction is incomplete. The combustion by-products may be physically deposited on the catalyst surface, which may block fluid flow and active sites. Further, certain combustion by-products may bind to the active sites, thereby poisoning the catalyst and decreasing activity downstream. This catalyst abuse can also result in a shortened catalyst lifespan.

The start-up combustor flame temperature operating range can be reduced either by increasing the air inlet temperature or by employing a non-premixed combustor zone. However, it is desirable to broaden the operating range of the start-up combustor flame temperature for heating the downstream reactors. A broadened operating range at the minimum, or lower end, reduces the requisite flame temperature and potential catalyst damage due to high temperatures. Thus, there is a need for a rapid start-up system in a fuel processor that provides the ability to operate the combustor flame at lower temperatures during fuel rich operations while providing protection and a longer lifespan for the downstream fuel processor reactors.

SUMMARY OF THE INVENTION

One aspect of a preferred embodiment of the present invention is a retention device for use in a fuel processing unit in an electrochemical fuel cell power plant, comprising a first and second chamber connected to one another by an interconnection passage, where fluid communication between the first and second chamber is established. The first chamber contains a combustor for preheating the second chamber during start-up mode. The second chamber contains at least one active catalyst bed. Byproduct compounds are formed by the combustor in the preheater combustor chamber during start-up. A retention material is contained within the interconnection passage which retains the byproducts formed by the combustor in the preheater combustor chamber. The retention material can include a support structure and an active compound. Preferred materials collect and retain carbon containing byproduct compounds.

Another aspect of the preferred invention includes a retention device disposed in the interconnection passage that includes an electrical charging device and a retention material that captures byproduct compounds formed within the preheater combustor chamber which pass through the interconnection passage into the second chamber.

The present invention also provides a method for protecting fuel reforming catalysts during a start-up mode in a fuel processor which includes the steps of:

1) lighting a flame in a preheater combustor in a first chamber to provide heat to a second chamber which are in fluid communication with one another, 2) feeding fuel to said flame in greater proportion to oxygen than the stoichiometric ratio such that byproduct compounds form, 3) collecting the byproduct compounds in a retention material located within the interconnection passage.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention. Thus, variations that do not depart from the gist of the invention are intended to be within the scope of the invention.

BRIEF DESCRIPTION OF THE DRAWINGS

The present invention will become more fully understood from the detailed description and the accompanying drawings, wherein:

FIGS. 4A and 4B are cross-sectional views taken along line 4-4' of FIG. 3; showing a circular and a rectangular cross-sectional shape.

FIG. 5 is a schematic illustration of a second preferred embodiment of the present invention, including a retention device adjacent to a preheater combustor chamber and a narrowed interconnection passage.

FIG. 6 is a schematic illustration of a third preferred embodiment of the present invention, including a retention device adjacent to a reactors chamber and a narrowed interconnection passage.

FIG. 7 is a schematic illustration of a fourth preferred embodiment of the present invention, including a retention device contained within a narrowed interconnection passage.

DETAILED DESCRIPTION OF THE PREFERRED EMBODIMENTS

The following description of the preferred embodiments is merely exemplary in nature and is in no way intended to limit the invention, its application, or uses.

The present invention relates to a retention device in a fuel processing unit of a fuel cell power plant for improving start-up operations. During a thermal start-up for a fuel processing unit in an electrochemical fuel cell power plant, several of the goals for start-up include: a rapid heating of the downstream reactors, most particularly the primary reactor, to enable endothermic reactions and high reaction conversions; a flame temperature that remains below the temperatures where the catalyst infrastructure physically degrades; avoidance of condensate deposition on the downstream catalysts; protection of the downstream fuel cell stack from carbon deposition and carbon monoxide poisoning; avoidance of oxidizing downstream catalysts; and energy efficiency.

Figure 1:
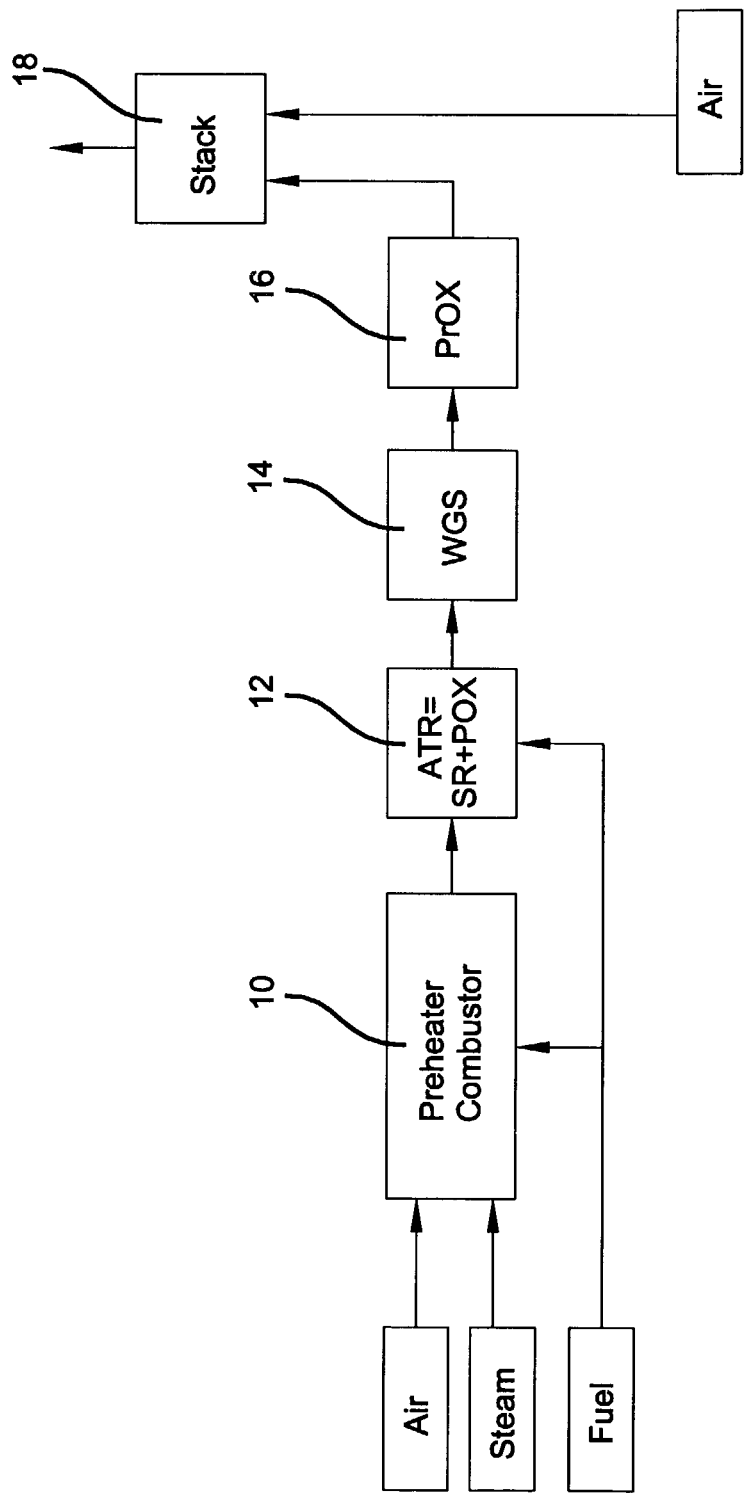
FIG. 1 is a schematic illustration of a fuel cell fuel processing unit including a start-up preheater combustor.

With reference to FIG. 1, one preferred start-up method includes a direct inline thermal preheater combustor 10 upstream from the autothermal reformer (ATR) 12 which is fired at conditions which favor rapid heating of the ATR 12. During steady-state operations, the ATR effluent enters, in sequence, the water gas shift reactor 14 and preferential oxidation reactor 16, from which the hydrogen-containing effluent stream is fed to the fuel cell stack 18.

During start-up, a combustor flame in the preheater combustor 10 can be operated in lean, rich, or stoichiometric conditions. The designation 'lean' refers to fuel being fed in a sub-stoichiometric amount to oxygen. A lean flame equates to an equivalence ratio below a value of 1 where the equivalence ratio is defined as:

$$E.Q. = \frac{\left(\frac{m_f}{m_o}\right)_{actual}}{\left(\frac{m_f}{m_o}\right)_{stoichiometric}}$$

where $m_f$ is the mass of the fuel and $m_o$ is the mass of the oxygen and "stoichiometric" refers to the complete combustion of fuel to carbon dioxide and water. Likewise, the designation rich refers to a fuel being fed at a greater than stoichiometric amount to oxygen in a combustion reaction, which equates to an equivalence ratio of greater than 1. A stoichiometric amount of fuel to oxygen fed equates to an equivalence ratio of 1.

Figure 2:
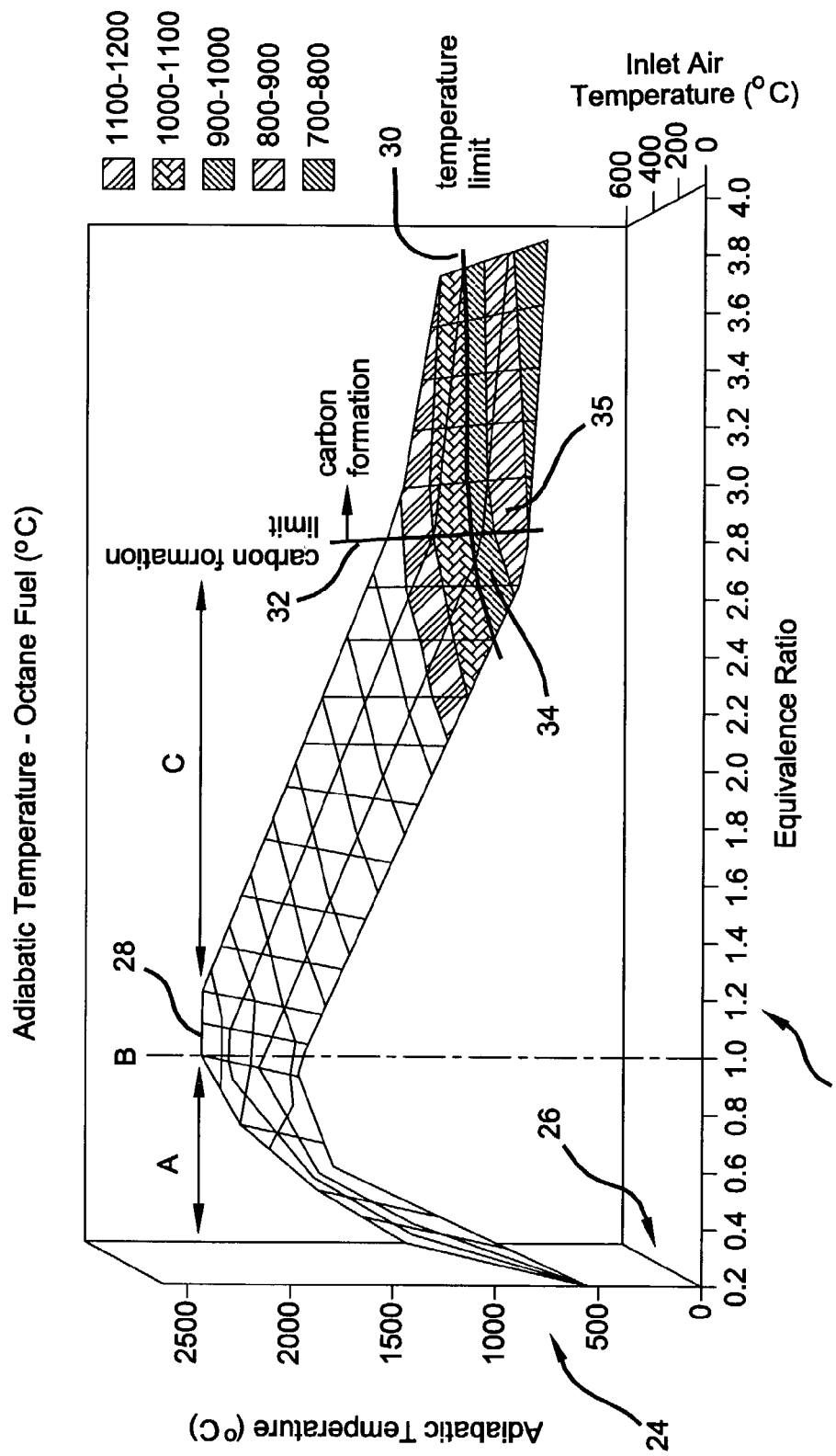
FIG. 2 is a graph which contains a plot of flame temperature of an octane fuel as a function of equivalence ratio and inlet air temperature, which shows carbon formation limits as a function of temperature and equivalence ratio.

As shown generally in FIG. 2, a flame temperature profile for an octane fuel is shown, where the equivalence ratio (E.Q.) is shown generally in the region along the x-axis 22, the flame temperature is shown along the y-axis 24, and the inlet air temperature is shown along the z-axis 26. Any hydrocarbon based combustible fuel may be used in the combustor, as one of skill in the art may select, and include by way of example, methanol, ethanol, gasoline, or methane. A preferred method of start-up includes operating the preheater combustor flame as a fuel rich flame, where the equivalence ratio is greater than 1, and more preferably greater than 2. The flame profile and desired equivalence ratio values may vary based upon combustor design configuration, fuel selection, air preheat, and other system parameters. When the equivalence ratio is less than 1, as is shown generally in the region along the line A to the left of line B, the flame temperature increases as the equivalence ratio increases, reaching a maximum temperature shown at 28 which occurs at an equivalence ratio of 1 where the fuel to oxygen fed is in stoichiometric proportion. As the amount of gas entering the combustion zone (additional fuel) is increased, a cooling effect occurs because the fuel is not fully combusted, thus a reducing trend is observed as the equivalence ratio increases beyond a value of 1, as shown along line C.

Thus, a preferred start-up operation scenario is fuel rich which provides a flame temperature capable of heating the downstream reactors, yet still remains relatively low. A typical operating range temperature for the start-up combustor is limited at higher temperatures by the physical properties of the catalyst downstream, which has the potential to degrade above about 700° C. to 1000° C., and at lower temperatures by the formation of byproduct compounds, such as carbon containing compounds, which are created by incomplete combustion byproducts, where either the flame temperature is too low, or the amount of fuel exceeds the oxidant available. Two forms of carbon-containing compounds (also referred to as "carbon") may be formed by a flame temperature that is below a threshold temperature or by inadequate oxidant levels. The first form is a substantially pure carbon compound typically formed in a solid or particulate state that is formed by pyrolysis of carbon droplets, aerosols, or agglomerates. By way of example these compounds may include: fullerenes; graphite sheets, layers, or fibers; or nanotubes. These compounds are nearly pure carbon compounds typically ranging from $C_{60}$ to $C_{84}$. Another form of undesirable carbon-containing compounds include partially combusted hydrocarbons (also referred to herein as "carbon precursors"). These compounds have a propensity to form layers on surfaces and later undergo pyrolysis to form a graphitic layer or compound. Examples of such carbon precursors include alkyl and aromatic hydrocarbons as are known in the art, including: propylene, ethylene, acetylene, butadiene, or benzene. These carbon-containing byproduct compounds will also deposit on the downstream catalytic surface and detrimentally decrease the catalyst activity.

The conventional operating range 34 for the start-up combustor flame temperature is contained within the boundaries of the upper maximum temperature limit 30 and the lower minimum temperature (or carbon formation limit) 32. The carbon formation limit 32 moves to lower equivalence ratios than depicted for a non-premixed combustor. The present invention provides a retention device that facilitates a start-up scenario that may employ a lower temperature flame with higher equivalence ratios, thus providing operation scenarios encroaching within the carbon formation range 35. If the permissible temperature for primary reactor lightoff is lower, the system requires less energy to achieve the activation of the downstream reactors and minimizes the potential physical degradation of the catalyst by lowering the operating temperature range. Additionally, a greater equivalence ratio also allows more excess fuel delivery to the downstream partial oxidation reaction in the ATR or partial oxidation on downstream reactors by air staging, thus increasing the exothermic heat release within the ATR or downstream reactors. Hence, steady-state normal operations occur more rapidly once the autothermal reformer and downstream reactors achieve temperatures within operating range. The retention device further provides insurance from catalyst deactivation by carbon containing byproduct compounds, such as carbon, and thus broadens the operating range and effectiveness of the start-up system, as well as extends the catalyst life by reducing abusive conditions.

Several start-up systems for the fuel processor are possible, variations of which are shown generally in FIGS. 3 through 7. A first chamber, the preheater combustor chamber or section 40, is connected to a second chamber, the fuel processor reactor chamber or section 42, by an interconnection passage 44. As shown in FIG. 3, one embodiment of the present invention includes the preheater combustor chamber 40, the interconnection passage 44, and the reactor chamber 42 located directly adjacent to one another. Fluid communication occurs between the preheater combustor chamber 40, through the interconnection passage 44, and to the reactor chamber 42. This permits gas flow and direct heat transfer via the combustion gases.

The preheater combustor chamber 40 includes a start-up fuel line 46, which feeds a fuel to a burner 50 forming the combustion zone 48, or flame. The burner 50 may include numerous burner designs, (which are characterized either by the method of fuel vaporization or stabilization of the flame), and may include: atomizers, swirling mixers, diffusion burners, or equivalents thereof, as are known in the art. An air feed passage 52, where oxygen is introduced, also leads to the combustion zone 48, where the oxygen is mixed with the fuel to achieve a combustion reaction. During start-up operations, the air feed passage 52 preferably provides air (oxygen and other diluents) to the preheater combustor chamber 40 and combustion zone 48. Alternatively, the air feed passage 52 could provide pure oxygen gas in lieu of air. The air feed passage 52 provides air for the reactor chamber 42 during normal steady-state operations. During normal operations, the start-up fuel line 46 ceases fuel delivery because the preheater combustion zone 48 is not in operation. However, the preheater combustor chamber 40 continues to serve as an air inlet passage for the reactor chamber 42. The combustion zone 48 also includes a spark igniter 54, which is used to ignite the fuel delivered from the start-up fuel line 46 and starts the start-up combustor flame within the combustion zone 48 at the commencement of the start-up process.

The heated gases originating from the combustion zone 48 travel through the interconnection passage 44, and further enter the reactor chamber 42. As best seen in FIG. 4, retention material 60 is contained within the interconnection passage 44, where it is in contact with the interior surface 62 of the interconnection passage 44 and forms a sealed throughway in the interconnection passage 44. The interconnection passage can include various cross-sectional shapes, for example, a square passage, a rectangular passage (FIG. 4b) or a circular passageway (FIG. 4a). The heated gases exiting the preheater combustor chamber 40 must pass through the retention material 60 which enables gas flow en route to the reactor chamber 42.

The present invention provides a retention material 60 for retaining byproduct compounds (e.g. carbon-containing compounds). "Retain" refers to collecting targeted byproduct compounds within the retention device to prevent passage into the downstream chambers. The retention of these specific byproduct compounds is preferably a reversible reaction or self-cleaning, whereby the surface of the retention material 60 is regenerated, or purged of most byproduct compounds during a cleaning or regeneration cycle. Here, preferred materials include those that are regenerated during steady-state operating conditions where at least one oxygenated compound passes over the surface of the retention material. The oxygenated compound contains at least one oxygen atom in molecular form, such as oxygen gas (in an air stream) or water in a steam stream.

One preferred retention device includes a retention material 60 comprised of a support structure and at least one active compound. A preferred retention material 60 is porous, having vacuous interstitial spaces throughout the body of the material. The internal pores open to one another and form continuous pathways throughout the support structure that permits passage of fluids, therethrough. However, the pathways are preferably tortuous and there is no direct line of flow from one side of the retention material 60 to another (i.e. no linear pathways). Further, the retention material 60 preferably is highly porous, with impingement nodes within the pathways, that physically agitate particle laden gas by changing directions abruptly and frequently. These tortuous paths provide ample opportunity for interface between the surfaces of the retention material 60 and the particulate laden gas, further trapping particles as they pass through the retention material 60 by either physical means, chemisorption, or physiosorption.

Pore sizes within the retention material 60 may vary. However, a preferred range for an average pore radius is about between 80 microns to 120 microns, with a more preferred average pore radius of about 100 microns. A void fraction between 80-95% void is preferred to achieve minimal pressure drop and yet still trap the entrained particles or aerosols. As the gases pass through the porous material, a pressure differential is established between the inlet 64 and the outlet 66 of the retention material 60. Material selection also depends upon its relative flow resistance. A preferred gas pressure differential from the inlet 64 to the outlet 66 across the retention material 60 is between the range of from about 0.5 to about 2.5 Kilopascals. This range preferably does not exceed 2.5 Kilopascals even at maximum byproduct loading within the surfaces of the material.

The volume and choice of the retention material is dictated by various factors within the system. These factors include: the quantity of byproducts to be collected (based on the fuel selection, system operating temperature, and equivalence ratio); the differential pressure of the retention material 60 (including the maximum tolerance which occurs when the retention material is fully loaded with byproduct compounds); and the rate of byproduct compound collection dictated by each individual retention material 60 and its respective collection mechanism (e.g. physical filtration, chemisorption, or physiosorption).

Various mechanisms for collection of either gaseous or solid state byproduct compounds are available in a variety of active compounds, as are known in the art. A few preferred mechanisms by which active compounds retain byproduct compounds include chemisorption and physiosorption, and combinations thereof. Physiosorption is typically described as a physical adsorption reaction, where van der Waals intermolecular forces, or induced dipoles, accumulate solute molecules at an interface zone (such as a gas-gas, gas-solid, or solid-solid interface). The transfer of carbonaceous byproduct compounds from the gas to the retention material 60 is one example, where a slightly polar active compound attracts generally non-polar molecules at the surface. When atmospheric parameters are changed (i.e. temperature and/or pressure), the reaction favors dissociation of the collected molecules into the gas phase based on changing equilibria at the interface, known generally as an adsorption reaction mechanism. This retention material 60 enterprises on selecting a material for certain targeted byproduct compounds, that adsorbs byproduct compounds at a lower temperature and pressure (i.e. during start-up operations), and desorbs at a higher temperature and pressure (i.e. during steady-state operations).

Chemisorption similarly accumulates byproduct compound molecules at the surface of the retention material 60. However, the active compound at the surface provides active sites, whereby chemical bonding and reaction occurs with the active compound at the surface. A typical chemisorption reaction is catalysis, whereby at least one of the molecules of the active compound participates in an intermediate step of the reaction and is subsequently released to its original form. Catalysts reduce the activation energy necessary for the reaction. A preferred catalyst donates electrons to the reaction by altering oxidation states, and then is regenerated after each reaction to the original oxidation state. Thus, active compound selection within the retention material 60 may include a chemisorption reaction with the byproduct compounds. A preferred catalysis reaction includes one where the byproduct compound is collected at a lower temperature (during start-up operations) which either oxidizes and releases innocuous reaction products from the surface (i.e. $CO_2$), or retains the byproduct compounds and oxidizes them at higher temperatures during steady-state operating conditions. One advantage to using an oxidization catalyst as an active compound is enhancement of the removal of carbonaceous byproduct compounds with a potential for forming residual graphite layers that block active sites at the surfaces of the retention material 60.

Thus, as fuel processing system temperatures increase to the steady-state preferred operating range temperatures of from about 700° C. to 1000° C., the air drawn into the air feed passage 52 has a higher temperature which facilitates either oxidation or desorption of the byproduct compounds that were collected in the retention material 60 during the start-up operations.

As previously noted, a retention material 60 is comprised of both an active compound and a support structure. In some retention materials these may be distinct entities, but in other materials the active compound may be homogeneously interspersed within the support structure, or they may be one and the same (in a unitary body). Further, active compounds may be mixed within the retention material 60. One or more active compounds may be homogeneously mixed forming a uniform composition that is distributed within or on the surfaces of the retention material 60, some may be heterogeneous compositions of active compounds mixed uniformly throughout, and others may be of variable compositions and heterogeneously distributed throughout the retention material 60.

Active compounds can dually function as the support structure; can be premixed to form a unitary retention material 60 including support structure and active compound; or can be applied separately to the surface of the support structure. Active compounds may facilitate either a physiosorption or chemisorption reaction. Preferred active compounds include oxides of alkali metals found in Groups 1 and 2 of the Periodic Table. As referred to herein, "Group" refers to the Group numbers (i.e., columns) of the Periodic Table as defined in the current IUPAC Periodic Table. Also, mixed metal oxides formed with at least one transition metal selected from Groups 3 to 8 of the Periodic Table are preferred active compounds. Other preferred active compounds may include metal alloys that are homogenous compounds composed of two or more metals, or metals and non-metals, including at least one metal selected from Groups 2 to 12. A most preferred active compound includes at least one metal selected from the group consisting of: chromium, molybdenum, iron, cerium, and mixtures thereof. These preferred metals are known to oxidize carbonaceous products.

A further requirement for the support structure of the retention material 60 includes the capability of enduring thermal shock. Thermal shock refers to the shattering or destruction of a material when it experiences rapid swings in temperature. Many materials are unable to withstand such rapid changes and suffer from complete destruction of the material. Transient start-up conditions, including frequent temperature spiking, are experienced by the retention material 60, and thus the support structure must be capable of withstanding these temperature gradients.

A preferred embodiment of the present invention has a retention material 60 with an open-celled ceramic foam, which withstands high temperature, is lightweight, thermal shock resistant, and porous with tortuous channels through the material. A preferred open-celled ceramic foam may include a surface coating of at least one active compound. Surfaces of the material may optionally include internal pore surfaces, and can be coated by any conventional method as is known in the art, including for example, chemical vapor deposition or physical vapor deposition which applies the metals uniformly to the substrate with little waste.

Alternate preferred materials for construction of the retention device of the present invention are sintered metals and metallic foams. Sintered metals are formed by sintering small particles of metals together. The sintered metal possesses a porosity that permits tortuous fluid flow throughout the body of the material, and may contain the active compounds interspersed homogeneously or heterogeneously within. Metallic foams are also a viable option, as they provide tortuous pathways throughout, and further may include active compounds interspersed homogeneously, or may have an active compound coating applied after the foam fabrication process. Both sintered metals and metallic foam may be designed to: incorporate active compounds; withstand thermal shock; have a porous body; and a differential pressure within the desired ranges. Preferred metallic foams and sintered metals include, for example, those made of stainless steel, nickel or aluminum alloys.

Figures 3A, 3B:
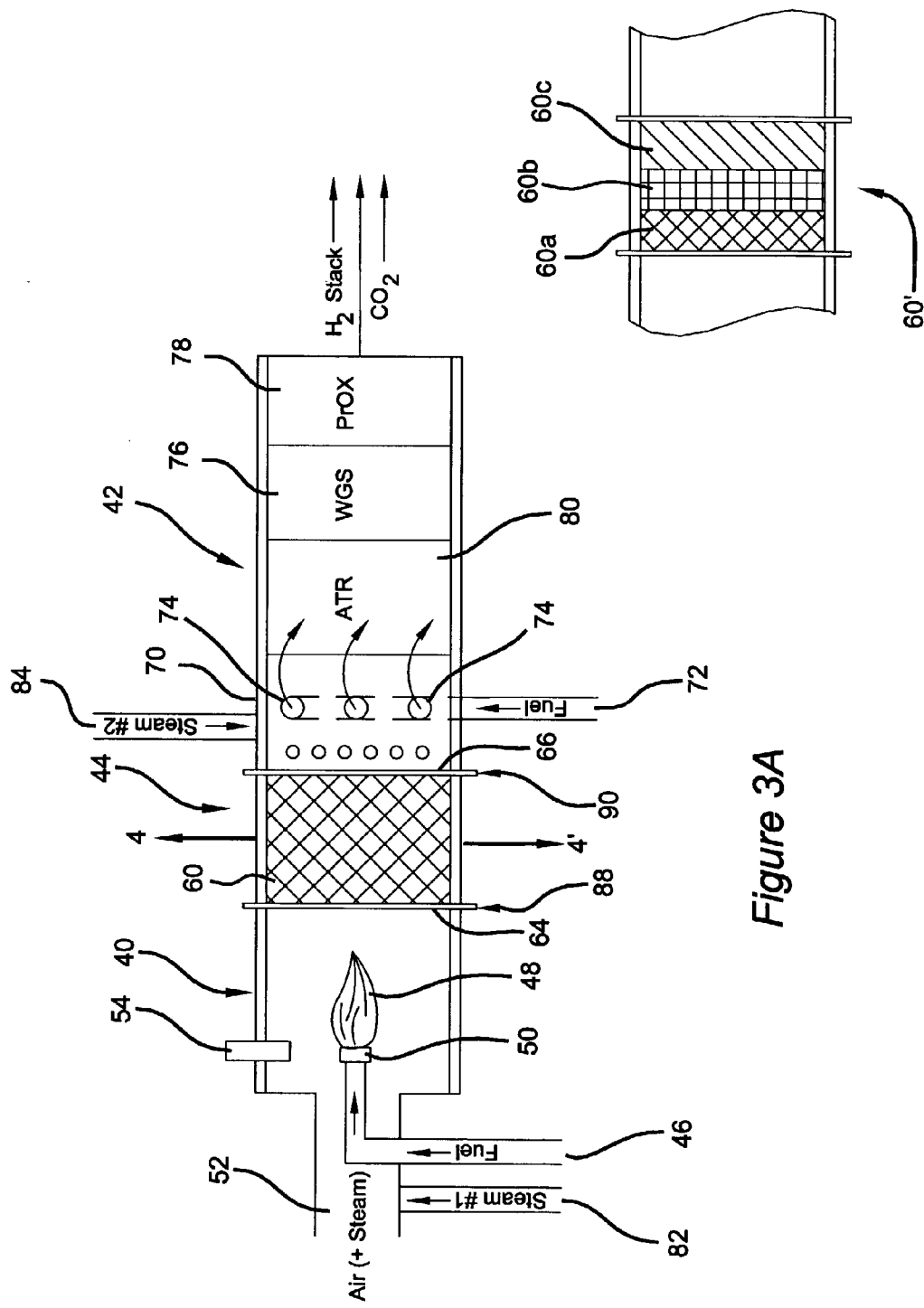
FIG. 3A is a schematic illustration of a first preferred embodiment of the present invention within a fuel processing unit including an inline direct fire start-up preheater combustor.
FIG. 3B is a schematic illustration of an alternate form of the retention material used in the first preferred embodiment.

With reference to FIG. 3B, an alternate embodiment of the present invention may include a retention material 60, with multiple distinct layers 60a, 60b, 60c, meaning the materials have separate compositions with unique characteristics, such as distinct active compounds, support structures, or both located sequentially downstream in the interconnection passage 44. These devices may be varied if multiple byproduct compounds are to be collected and have different characteristics, requiring sequential collection. Thus, a retention material 60 may contain multiple materials that are porous, with one or more of the active compounds or support structures described above.

With reference to FIG. 3A, the reactor chamber 42 includes a mixer section 70, where the reactor fuel inlet lines 72 lead to the inlet ports 74. The fuel inlet ports 74 disperse the fuel in a similar manner to the burner 50 in the preheater combustor chamber 40 during start-up operations. The fuel inlet ports 74 are dormant during start-up operations, as there is no fuel delivered during start-up operations. During steady-state operation the fuel inlet ports 74 deliver a gaseous fuel for the downstream reactors. Additionally, the mixer section 70 may be designed to enhance turbulent flow and fuel to air mixing prior to entering the reactor section 42. The fuel reforming reactors conduct a series of reactions that reform a hydrocarbon fuel to a hydrogen-containing reformate stream. The series of reactors may include: a partial oxidation (POx) reactor, steam reforming reaction (SR), a water gas shift reaction (WGS) 76, and finally a preferential oxidation reaction (PrOx) 78, after which the hydrogen created through these reactions is introduced to the fuel cell anode. One preferred embodiment includes an autothermal reformer (ATR) 80 which combines the POx and the SR reactions within one reactor.

The steam necessary for the ATR 80 and WGS 76 reactions can be introduced at numerous points prior to or at the entrance of the reactor chamber 42. One preferred embodiment includes a preheater combustor chamber 40 steam inlet line 82 that introduces steam into the system during steady-state operations. The steam mixes with the air (concurrently delivered) in the preheater combustor chamber 40. During steady-state operation, the preheater combustor chamber 40 serves as a mixing zone for the steam and air, as well as a passage to deliver steam and air to the downstream reactor chamber 42. In this steam delivery configuration, steam and air also pass through the retention material 60 within the interconnection passage 44. Depending on selection of material for the retention material 60, steam may be used to react with byproduct compounds deposited on the material surfaces.

Steam may alternately or supplementally be delivered directly to the reactor chamber 42 via a reactor chamber steam inlet 84. The steam mixes with the excess fuel and enters directly into the ATR 80 for the steam reforming reaction. As previously mentioned, steam entry ports can be placed in any useful position within the passages leading into the reactor section 42, or may be delivered directly to the reactors 76, 80 themselves. This configuration avoids steam flowing through retention material 60 within the interconnection passage 44, which may be preferred depending on the properties of the retention material selected.

Other preferred embodiments of the present invention include retention material 60 situated in different positions within the interconnection passage 44 between the preheater combustor section 40 and the reactor section 42. In some preferred embodiments, the interconnection passage 44 may convey the gases from the preheater combustor section 40 to the reactors section 42 through a narrow passage or over relatively long distances when the preheater combustor and reactor sections 40, 42 are not located within the same vicinity. The interconnection passage 44 diameter may be narrowed all along the length or in certain regions only, or may change to conform to the diameters of the preheater combustor section 40 or reactor section 42, including any variations in diameter therebetween. Thus, the retention material 60 may be situated adjacent to the preheater combustor section 40, the reactor section 42, or both, within the interconnection passage 44.

As shown in FIG. 3, the interconnection passage 44 is located proximate to the preheater combustor chamber 40 and the reactor section 42. The interconnection passage 44 is relatively the same cross-sectional area as the preheater combustor chamber 40 and reactor chambers 42, respectively, where both cross-sectional areas are substantially the same. The retention material 60 substantially fills the interconnection passage 44, starting at an inlet 88 of the interconnection passage 44 and ending at an outlet 90 of the interconnection passage 44.

Other preferred embodiments include varying the respective cross-sectional area of the interconnection passage 44 with respect to the cross-sectional areas of the preheater combustor chamber 40 and reactor section 42. In a second preferred embodiment shown in FIG. 5, the interconnection passage 44 narrows (or the cross-sectional area is less with respect to either the preheater combustor section 40 or reactor section 42) at a middle region inlet 92 and outlet 94 of the interconnection passage 44, and forms a narrowed duct between the preheater combustor chamber 40 and the reactor section 42. The retention material 60 is situated proximate to the preheater combustor chamber 40 at the inlet 88 to the interconnection passage 44. The interconnection passage 44 narrows at the middle region 96 and expands at the outlet 90 to a larger cross-sectional area commensurate in size with the reactor section 42.

In a third preferred embodiment shown in FIG. 6, contains a narrowing of the interconnection passage 44 at the middle region 96, similar to the narrowing configuration of FIG. 5. However, the retention material 60 is located proximate to the reactor section 42. The interconnection passage 44 narrows at the middle region 96, and expands after the middle region outlet 94 to a larger cross-sectional area equivalent to that of the reactor section 42. The retention material 60 is situated within the interconnection passage 44 between the expanded cross-sectional area and the interconnection outlet 90, adjacent to the reactor section 42. In this location, the retention material 60, in addition to collecting unwanted byproduct compounds, also provides for uniform fluid flow dispersion into the reactor section 42. As fluid flows from the narrow middle region 96, it encounters a porous retention material 60. Fluid flowing through the pores, or tortuous paths established throughout the body of the retention device material, is uniformly distributed as it exits the retention device. Thus, the retention material 60 serves both functions of flow distribution and retention of byproduct compounds, when the retention material 60 is selected to have porous characteristics.

In a fourth preferred embodiment of the present invention, shown in FIG. 7, the interconnection passage 44 has a narrower cross-sectional area than that of either the preheater combustor chamber 40 or reactor section 42. The retention material 60 begins at the interconnection inlet 88 and fills the interconnection passage 44 up to the outlet 90. Thus, the retention material 60 is proximate to the preheater combustor chamber 40 and the reactor section 42, but is located within a narrowed interconnection passage 44. This preferred embodiment also provides uniform fluid flow dispersion into the reactor chamber 42, as described in the third preferred embodiment above.

Figure 8:
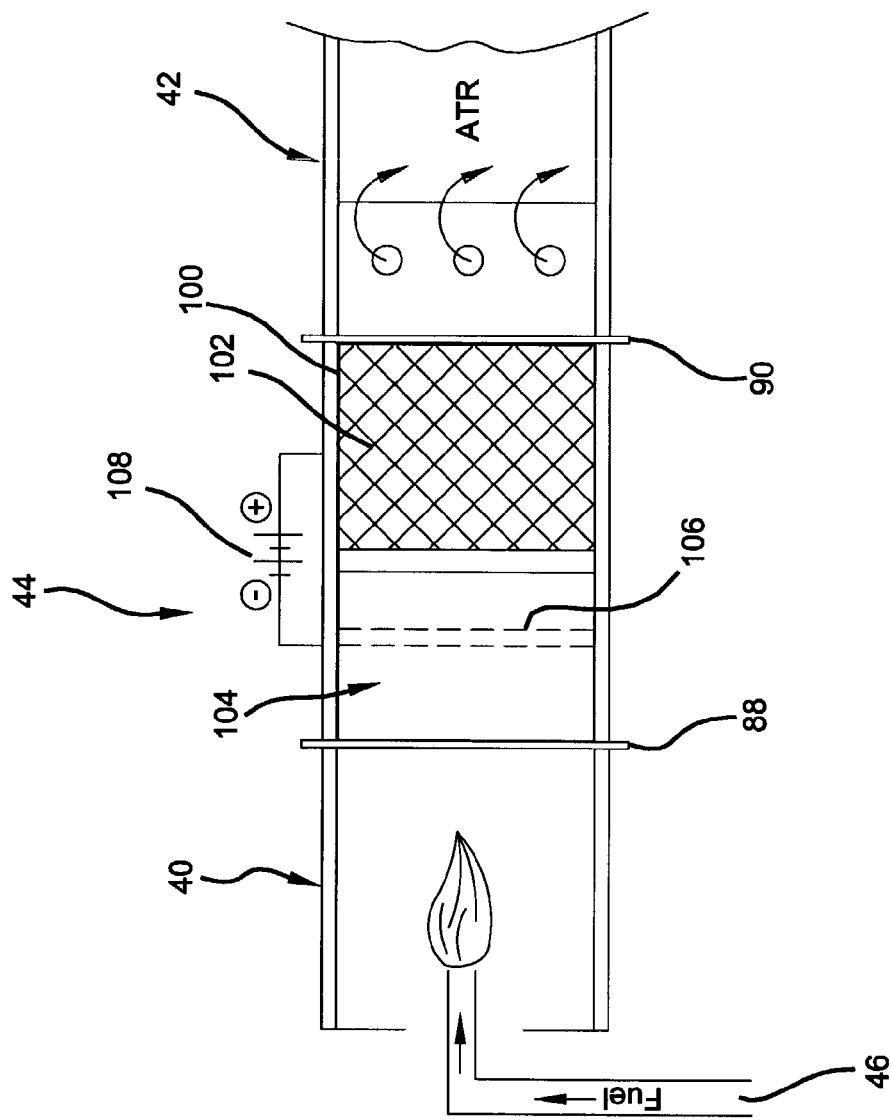
FIG. 8 is a schematic illustration of a fifth preferred embodiment of the present invention, including a retention device having a retention material and an electrical charging device.

In a fifth preferred embodiment shown in FIG. 8, the present invention includes a retention device 100 comprising a retention material, 102 and an electrical charging device 104. The byproduct compounds carried in the gas flow from the preheater combustor chamber 40 would enter the interconnection passage 44 at the inlet 88. A charging apparatus 108 would encompass a portion of the interconnection passage 44, where the byproduct compounds would pass through and become charged particles. Typically, a negative charge is delivered to the particles as they pass through a screen element 106 having a continuous charge applied thereto by a charging apparatus 108.

The charged particles (comprised of byproduct compounds) continue downstream in the interconnection passage 44. The retention material 102 is situated downstream (en route to the reactor section 42) from the charging device 104. The retention material 102 is charged to an opposite polarity of the charge delivered by the charging apparatus 108 upstream to the passing byproduct compound particles.

Typically, the retention material 102 would have a positive charge continuously delivered, and as the negatively charged particles pass through the retention material 102, the collection of particles at the charged surface is greatly enhanced by the difference in electrochemical potential between the particles and the surface (electrostatic attraction). Thus, as the gases pass through the retention device 100, collection of byproducts from the gases is enhanced both by the electrostatic charging device 104 and the retention material 102. The clean gases continue through the interconnection passage outlet 90 and into the reactor section 42.

After collection of the byproduct compounds is no longer necessary (i.e., when the start-up operations are finished and steady-state operations are commenced), the continuous charge applied to the retention material 102 can be discontinued. The lack of electrostatic attraction between the surface of the retention material 102 releases the compounds from the surface. Thus, the byproduct compounds can either be oxidized at the surface, or released from the surface and oxidized by the passing hot gases during normal steady-state operations.

A preferred method of start-up for a fuel processing system which protects the fuel reforming catalysts downstream from the preheater combustor chamber during start-up conditions includes the steps of:
1) lighting a flame 48 in a preheater combustor 40 in a first chamber to provide heat to a reactor section 42;
2) feeding fuel to the preheater combustor flame 48 in a fuel rich operating scenario, where fuel is fed to the preheater combustor flame 48 in greater proportion than the stoichiometric ratio such that byproduct compounds form;

3) collecting the byproduct compounds with the retention material 60, or retention device 100.

The method of start-up may include all previously described embodiments of the present invention, including variations of the retention device for byproduct compound collection.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel processor comprising:
   a combustor disposed within a first chamber for preheating a second chamber when the fuel processor is operated in a start-up mode, wherein said combustor forms carbon-containing byproduct compounds selected from pure carbon compounds and partially combusted hydrocarbons;
   at least one fuel reforming reactor contained within said second chamber;
   an interconnection passage disposed between said first chamber and said second chamber to provide fluid communication therebetween; and
   a retention material contained within said interconnection passage which retains said carbon-containing byproduct compounds formed by said combustor; wherein said retention material is regenerated by oxygenated compounds entering through said first chamber into said interconnection during said run mode.

2. The fuel processor according to claim 1, whereby when said fuel processor is in said start-up mode said combustor is operated with a fuel rich flame.

3. The fuel processor according to claim 1, wherein said retention material retains carbon-containing byproduct compounds via physiosorption.

4. The fuel processor according to claim 3, wherein said retention material releases said carbon-containing byproduct compounds by a desorption mechanism when the fuel processor is operated in a run mode.

5. The fuel processor according to claim 1, wherein said retention material retains carbon containing byproduct compounds via chemisorption.

6. The fuel processor according to claim 1, further comprising a charging device disposed in said interconnection passage between said first chamber and said retention material; whereby said byproduct compounds exiting said first chamber are electrically charged by passing through said charging device; and further said retention material is charged with an opposite polarity to enhance collection of said byproduct compounds.

7. The fuel processor according to claim 1, wherein said retention material is porous.

8. The fuel processor according to claim 1, wherein said retention material comprises a support structure and at least one active compound.

9. The fuel processor according to claim 8, wherein said at least one active compound comprises a metal selected from the group consisting of: alkali metals from Groups 1 to 2 of the Periodic Table, transition metals from Groups 3 to 8 of the Periodic Table, and mixtures thereof.

10. The fuel processor according to claim 9, wherein said active compound comprises a metal selected from the group consisting of:
    chromium, molybdenum, iron, and mixtures thereof.

11. The fuel processor according to claim 8, wherein said at least one active compound comprises at least one alloy of a transition metal from Groups 3 to 8 of the Periodic Table.

12. The fuel processor according to claim 11, wherein said active compound is applied as a surface coating to said support structure.

13. The fuel processor according to claim 8, wherein said support structure is comprised of sintered metal.

14. The fuel processor according to claim 8, wherein said support structure is comprised of an open-celled foam.

15. The fuel processor according to claim 14, wherein said open-celled foam is comprised of ceramic material.

16. The fuel processor according to claim 14, wherein said open-celled foam is comprised of a metal.

17. The fuel processor according to claim 8, wherein said support structure and said active compound are homogeneously interspersed throughout said retention material.

18. The fuel processor according to claim 1, wherein said retention material comprises at least two layers of distinct materials.

19. The fuel processor according to claim 1, wherein said retention material is located within said interconnection passage adjacent to said first chamber.

20. The fuel processor according to claim 1, wherein said retention material is located within said interconnection passage adjacent to said second chamber.

21. The fuel processor according to claim 20, wherein said retention material further provides uniform flow distribution of inlet gases to said second chamber.

22. A method for protecting fuel reforming catalysts of a fuel processor operating in a start-up mode comprising the steps of:
    lighting a flame in a preheater combustor in a first chamber to provide heat to a reactor section in a second chamber, wherein said first chamber and said second chamber are in fluid communication by an interconnection passage disposed between said first chamber and said second chamber;
    feeding fuel to said flame in greater proportion to oxygen than the stoichiometric ratio such that byproduct compounds form, wherein the byproduct compounds are selected from pure carbon compounds and partially combusted hydrocarbons; and
    collecting said byproduct compounds in a retention material located within said interconnection passage; wherein said regeneration step is facilitated by oxygenated compounds entering through said first chamber into said retention material during a run mode, wherein said retention material is porous.

23. The method according to claim 22, further comprising the step of collecting said byproduct compounds by electrically charging said byproduct compounds in said interconnection passage between said first chamber and said retention material, wherein said retention material is charged with an opposite polarity and retains said byproduct compounds.

24. The method according to claim 22, further comprising a regeneration step, whereby said retention material is purged of said collected byproduct compounds.

25. The method according to claim 24, wherein said regeneration step further comprises purging said retention material by reacting at least one byproduct compound with an active compound in said retention material.

26. The method according to claim 25, wherein said active compound comprises a metal selected from the group consisting of:
    chromium, molybdenum, iron, and mixtures thereof.

27. The method according to claim 25, wherein said active compound comprises at least one alloy of a transition metal from Groups 3 to 8 of the Periodic Table.

* * * * *